No. 791,712. PATENTED JUNE 6, 1905.
W. V. MORRIS & J. H. TAYLOR.
CASTER.
APPLICATION FILED FEB. 9, 1905.

2 SHEETS—SHEET 1.

WITNESSES:
F. C. Barry.
Edw. W. Vaill Jr.

INVENTORS
William V. Morris and
James H. Taylor

ATTORNEY.

No. 791,712. PATENTED JUNE 6, 1905.
W. V. MORRIS & J. H. TAYLOR.
CASTER.
APPLICATION FILED FEB. 9, 1905.
2 SHEETS—SHEET 2.
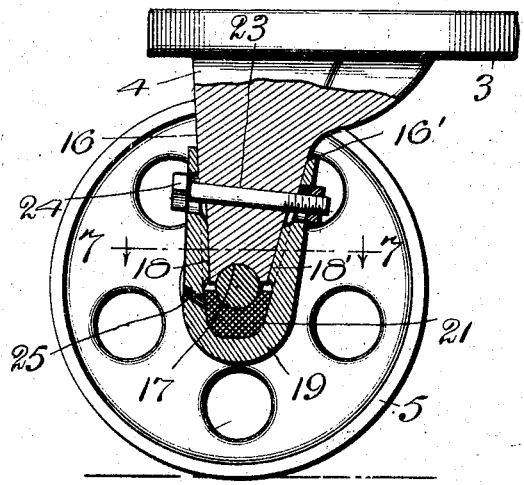
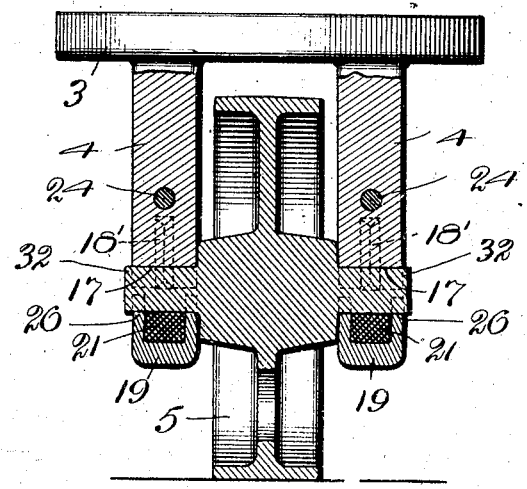
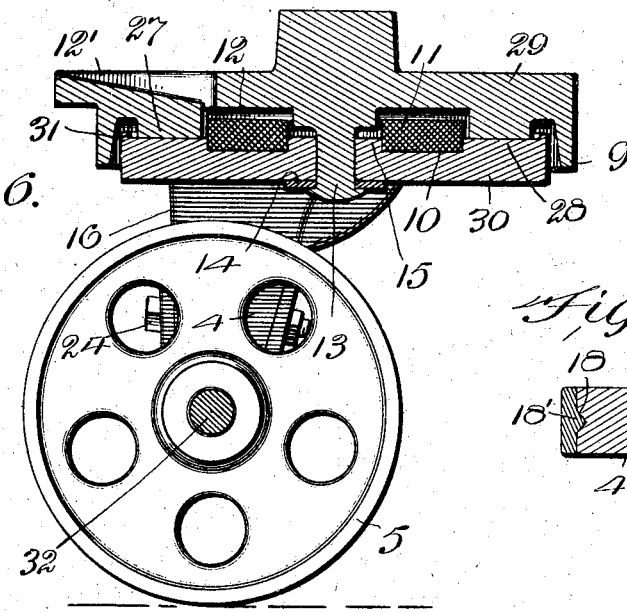
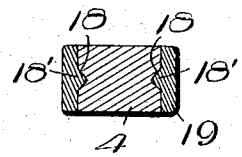
WITNESSES:
F. C. Barry
Edw. W. Vaell Jr.
INVENTORS
William V. Morris and
James H. Taylor
By
ATTORNEY No. 791,712.

Patented June 6, 1905.

UNITED STATES PATENT OFFICE.

WILLIAM V. MORRIS AND JAMES H. TAYLOR, OF PHILADELPHIA, PENNSYLVANIA.

CASTER.

SPECIFICATION forming part of Letters Patent No. 791,712, dated June 6, 1905.

Application filed February 9, 1905. Serial No. 244,831.

*To all whom it may concern:*

Be it known that we, WILLIAM V. MORRIS and JAMES H. TAYLOR, citizens of the United States, and residents of the city of Philadelphia, State of Pennsylvania, have invented certain new and useful Improvements in Casters, of which the following is a full, clear, and complete disclosure.

The object of our invention is to produce a caster for trucks, articles of furniture, and similar devices which may be pivoted on a vertical axis to turn easily in any direction and also which may have a bearing for the roller of the truck which may turn easily and also be lubricated continuously and efficiently and of which the parts will be firmly and rigidly attached together without danger of separation due to the rolling of the caster or other jarring.

A further object of our invention is to produce dust-proof bearings both for the vertical pivots and for the pivot of the roller or wheel.

A further object of our invention is to produce such a construction that the said parts will be continuously lubricated without the danger of the oil or other lubricant leaking from the bearings or from otherwise becoming spread upon the exterior of the caster and soiling the same.

For a full, clear, and exact description of our invention reference may be had to the following specification and to the accompanying drawings, describing and showing two forms thereof.

Figure 1:
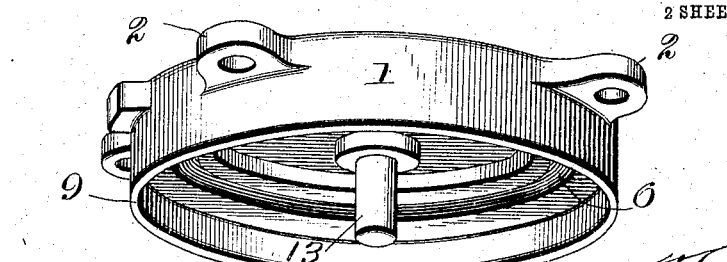
Figure 1:
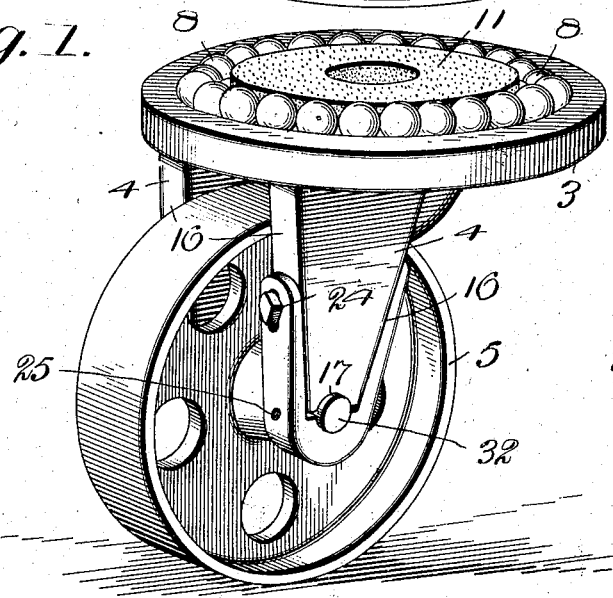
Figure 3:
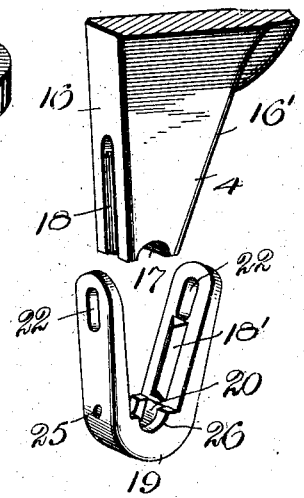
Figure 2:
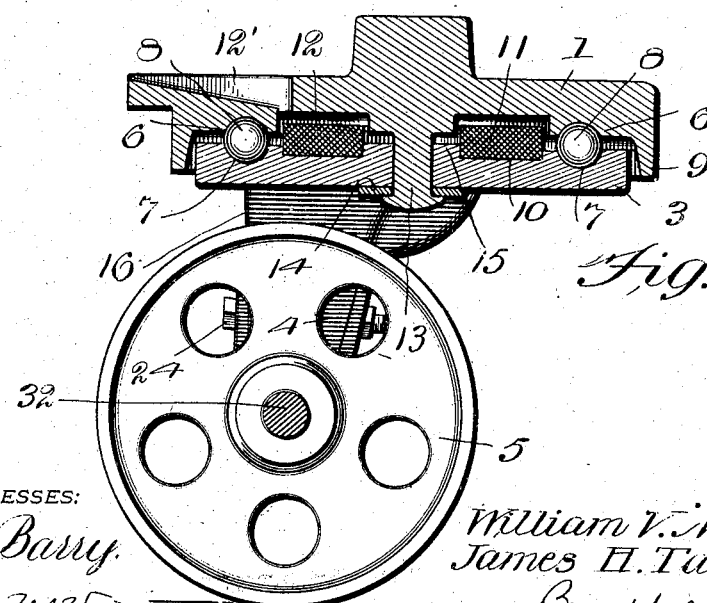

In the drawings, Figure 1 represents a perspective view of one form of our improved caster having the cap or top plate which is attached to the truck separated from the body of the caster. Fig. 2 is a vertical central sectional view thereof, taken substantially through the center of the caster shown in Fig. 1. Fig. 3 is a view of one of the legs or bearings of the caster, showing the oil-cup and retaining member separated from said leg or bearing. Fig. 4 is a vertical sectional view taken centrally through one of the legs or bearings of another form of our improved caster. Fig. 5 is a vertical transverse sectional view, taken through the axis of the wheel, of the form of caster shown in Fig. 4. Fig. 6 is a central vertical sectional view of a caster of the form shown in Figs. 4 and 5. Fig. 7 is a horizontal transverse sectional view of one of the legs or bearings of the caster, showing the means for holding the oil-cup and retainer in place and taken substantially on the line 7 7, Fig. 4.

Referring to the drawings, the numeral 1 indicates a plate or upper bearing member which is adapted to be attached to a truck or other device by means of screws passing through lugs 2 or similar well-known means.

The numeral 3 indicates a lower bearing-plate which is adapted to carry the bearing members or legs 4, at the lower end of which are bearings for the axle of the wheel 5.

In the form of the device shown in Sheet 1 we have indicated the use of ball-bearings, the construction being adapted to effectively coöperate therewith. The upper bearing-plate 1 is for this purpose provided with a semicircular ball track or groove 6, and the lower bearing-plate 3 is provided with a corresponding ball track or groove 7. Within these grooves are placed a series of steel antifriction-balls 8. At the periphery of the bearing-plate 1 a depending flange 9 is provided, which prevents dust and other foreign matter from entering the bearing. In the lower bearing-plate 3 and within the ball track or groove 7 and concentric therewith is an annular depression or groove 10, which is adapted to carry a ring or annulus of felt or other similar fibrous material 11. This annulus of fibrous material projects upwardly out of the groove for a short distance and into a similar but wider groove 12 in the upper bearing-plate 1. For the purpose of supplying oil to the felt ring 12 and the inner side of the ball-bearings we provide a channel 12', which may be in the form of a groove, as indicated in Fig. 2, or may be simply a hole passing through the upper member 1. This channel communicates at its inner end with the groove 12 in the upper bearing member or plate 1. The upper bearing-plate 1 is also provided with a central pin or stud 13, which projects through a central bearing or hole in the lower bearing-plate 3 and is headed over so as to retain said lower bearing-plate firmly but pivotally in position, a washer 14 being interposed between the lower surface of the plate 3 and the headed portion of the stud 13. The surface of the lower bearing-plate surrounding the stud 13 is slightly higher than the outer surface of said plate, within which is the groove 7, as indicated at 15. This is for the purpose of preventing too much oil from passing between the bearing-pin 13 and the plate 3.

The caster wheel or roller 5 is pivoted upon the lower end of the legs 4 and is retained in position thereon in the following manner: Said legs are formed, as indicated in Figs. 1 and 3, by tapering or converging edges 16 and 16', and the lower end of said legs are provided with a semicircular bearing groove or recess 17. The converging sides of the leg 4 are provided with V-shaped grooves 18, which are adapted to receive V-shaped ribs or feathers 18', carried on the inner sides of the arms of the retaining member 19. This retaining member 19 is made in the form of a U-shaped strap having its sides slightly diverging, the curved portions connecting the sides being recessed, as indicated at 20, to form a cup or receptacle for waste or other fibrous material 21, which may be used in connection with the bearing, as indicated in Figs. 4 and 5. The outer ends of said member 19 are provided with elongated holes or slots 22, which correspond to a transverse hole 23 in the leg or bearing member 4, and these openings are adapted to receive a bolt or similar fastening device 24. In the lower portion of the retaining member 19 is provided an inclined oil-hole 25, which communicates with the cup or recess 20 in the lower end of said member. The sides of the member 19, which form the cup 20, are provided with semicircular notches or recesses 26, which correspond in shape to the lower side of the axle 32 of the wheel 5. It will now be seen that after said axle 27 has been placed within the bearing-grooves 17 the straps or retaining members 19 are slid upwardly on the legs or bearing members 4, so that the ribs 18' engage with the grooves 18, and when the said retaining member has reached the limit of its upward movement the bolt 24 is passed through the slots 22 and the hole 23 and screwed tightly in position. By this construction it will be seen that we have produced an extremely efficient yet simple construction, both for the vertical bearing parts of the caster and for the horizontal bearings of the caster-wheel.

The modification shown in Figs. 4 to 6, inclusive, is substantially the same as that previously described as regards the bearings for the axle of the caster-wheel; but instead of having the balls interposed between the bearing members for the vertical pivot we omit the same and provide flat smooth bearing-surfaces 27 and 28 in the upper and lower bearing members 29 and 30, respectively, and at the outer margin of the lower bearing member 30 is provided a small flange or circular rib 31 for preventing the oil which may flow outwardly between the surfaces 27 and 28 from running over the edge of the lower bearing member. It will therefore be seen that this modification is substantially the same in effect and result as that previously described, the substantial difference being in the omission of the ball-bearings and in providing flat bearing-surfaces in the place thereof.

Among the advantages and functions due to the constructions set forth in the above description and shown in the drawings is the fact that the bearing for the vertical pivot is thoroughly protected from dust and other foreign substance, while at the same time the same may be thoroughly and efficiently lubricated and after such lubrication will require little or no attention for a long period of time, and the construction of the bearings for the vertical pivot gives a firm broad base, which will obviate any tendency of the bearing-plates 1 and 3 to tilt or move transversely in relation to each other. The construction of the drawings for the axle of the caster-wheel also provides a firm and strong retaining member within which the lubricating means is always retained effectively and without any tendency of the fibrous material becoming wedged or interfering with the rotation of said caster-wheel. Furthermore, these parts are retained tightly in position and are not liable to become separated by the jarring of the caster as the same rolls or passes over uneven surfaces or when subjected to the rough use of trucks and similar vehicles or devices.

Having thus described our invention, it will be obvious that various changes may be made in the form, arrangement, and proportion of parts, and mechanical equivalents may be substituted without departing from the spirit and scope of our invention; but

What we claim, and desire to protect by Letters Patent of the United States, is—

1. In a caster or similar device, a pair of pivotally-related bearing members, corresponding grooves in said bearing members, and fibrous material retained in one of said grooves, one of said bearing members being provided with an oil-channel communicating with said grooves.

2. In a caster or similar device, a pair of pivotally-related bearing members, one of said members having a peripheral downwardly-extending flange, said members having corresponding bearing-surfaces, and fibrous material located intermediate of said bearing-surfaces and the pivot of said members, one of said bearing members being provided with means for allowing lubricant to be supplied to said fibrous material.

3. In a caster or similar device, a pair of pivoted bearing members, antifriction devices interposed between said bearing members, one of said bearing members having an annular groove, fibrous material retained within said groove, the other of said bearing members having a corresponding groove into which said fibrous material projects, the upper bearing member having an oil-channel which communicates with the groove therein.

4. In a caster or similar device, a pair of pivotally-related bearing members, the upper of said bearing members having a depending annular flange, antifriction devices interposed between said bearing members, one of said members having an annular groove located between said antifriction devices and the pivot for said members, fibrous material retained within said groove, the other bearing member having a corresponding groove into which the fibrous material projects, and said upper bearing member having an oil-channel which communicates with the groove therein.

5. In a caster or similar device, a pair of projecting bearing members or legs, a caster-wheel adapted to engage said bearing members, U-shaped retaining members passing around the ends of said bearing members and having portions engaging the lateral edges of said bearing members, means for clamping said retaining members to said bearing members, said U-shaped members being provided with interior chambers or recesses, and fibrous material contained in said recesses.

6. In a caster or similar device, projecting bearing members or legs, a caster-wheel the axle of which is adapted to engage the ends of said bearing members, U-shaped retaining members passing around the ends of said bearing members and clamped to the lateral edges thereof, said retaining members being provided with cups or recesses in their curved portion, and fibrous material contained within said recess.

7. In a caster or similar device, a pair of projecting bearing members or legs, a caster-wheel the axle of which is adapted to engage the ends of said bearing members, U-shaped retaining members passing around the ends of said bearing members, means for clamping said bearing members to said legs, said bearing members and the inner sides of said retaining members being provided with longitudinal projections and recesses for retaining the parts more firmly in engagement.

8. In a caster or similar device, a pair of parallel legs or bearing members, a caster-wheel the axle of which is adapted to engage the ends of said bearing members, U-shaped straps or retaining members passing around the ends of said bearing members and clamped to the lateral edges thereof, the arms of said U-shaped retaining members and the bearing members being provided with grooves and corresponding flanges for holding the same more firmly in engagement.

9. In a caster or similar device, a pair of parallel bearing members or legs, the edges of which converge toward their outer ends, a caster-wheel the axle of which is adapted to engage the lower ends of said bearing members, U-shaped retaining members adapted to pass around the ends of said bearing members and said axle and having diverging arms corresponding to the converging sides of said bearing members, and means for clamping said arms to said bearing members.

10. In a caster or similar device, a pair of projecting bearing members or legs having edges which converge toward their outer ends, a caster-wheel the axle of which is adapted to engage the ends of said bearing members, U-shaped retaining members or straps adapted to pass around the ends of said bearing members and said axle, and having diverging arms corresponding to the diverging edges of said bearing members, said arms and edges having corresponding grooves and flanges for holding the same more firmly in position, and means for clamping said arms to said bearing members.

In witness whereof we have hereunto set our hands this 8th day of February, 1905.

WILLIAM V. MORRIS.
JAMES H. TAYLOR.

Witnesses:
FRED. J. ROBERTS,
JOHN J. ROBERTS.